INVENTORS
Robert K. Sedgwick
Werner K. Behrendt
Hans J. Baechle
BY William C. Glesner Jr.
Attorney

FIG. 5

INVENTORS
Robert K. Sedgwick
Werner K. Behrendt
Hans J. Baechle
BY William C. Gliesner Jr.
Attorney

United States Patent Office 3,461,472
Patented Aug. 19, 1969

3,461,472
MACHINE TOOL WITH AUTOMATIC
TAPPING CONTROL
Robert K. Sedgwick, Waukesha, Wis., and Werner K.
Behrendt, St. Anna-Garten, and Hans J. Baechle, Rockford, Ill., assignors to Kearney & Trecker Corporation,
West Allis, Wis., a corporation of Wisconsin
Original application Mar. 13, 1962, Ser. No. 181,226.
Divided and this application Oct. 25, 1966, Ser. No. 589,330
Int. Cl. B23g 1/04
U.S. Cl. 10—139          3 Claims

ABSTRACT OF THE DISCLOSURE

This invention relates to an improved automatic tapping control particularly adapted to be used in a machine tool. A control member carried by the spindle for limited axial movement is connected to actuate a control for continuously modulating the axial spindle feed rate during a tapping operation. A tap is carried by the spindle for rotation and for limited axial control movement relative thereto for moving the tap control member to continuously modulate the preset axial feed rate of the spindle during a tapping operation.

---

This is a division of our copending application, Ser. No. 181,226, filed Mar. 13, 1962 for a Machine Tool With Tool Changer.

The principal object of this invention is to provide an improved automatic tapping control for a machine tool.

As is well-known in the machine tool art, when using a tapping tool, the rate of rotation of the tap must be in a proportion to the rate of feeding movement to conform to the pitch of the thread being machined, herein also referred to as the inherent feed of the tool into the work. In the instant invention the rates of rotation and feeding movement are set for the pitch of a particular tap, either manually or by an automatic control. Whenever the ratio between these rates become disproportionate to the feed of the tool into the work, or in accordance with the pitch of the tool as an example, the invention provides means to modulate the set ratio in varying amounts to insure that the tapping tool will be driven into the work in accordance with its pitch.

The complete sequence of machine movements necessary to effect a tapping operation is initiated in response to a manual or tape controlled signal with the necessary movements proceeding automatically in response thereto. Preferably, the entire machine tool is initiated by a predetermined program constituting a tape control system.

The tape control system incorporates the usual feed back error signal circuit and, in particular, the instant invention connects a potentiometer in the error signal circuit, the potentiometer being controlled by relative movement between the tapping tool and the spindle. The relative movement is achieved when the tape control drive of the tool is disproportionate to the feed of the tool into the work in accordance with its pitch This specification is limited to the divisional aspects of the invention, but other constructions of the machine tool as a whole can be understood from the disclosures of our copending applications listed above.

The following and other objects of the invention which will become more fully apparent from the following description of the machine tool may be achieved by the embodiments described herein, as illustrated in the accompanying drawings, in which.

Figure 1:
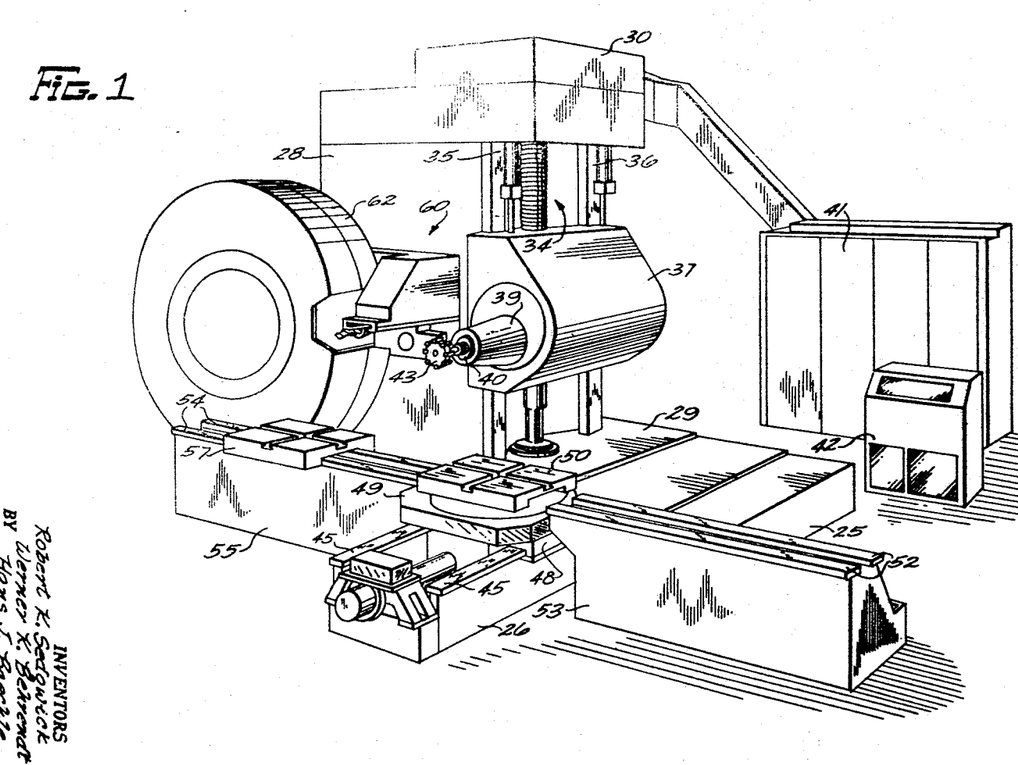
FIGURE 1 is a view in perspective of a horizontal spindle machine tool giving the general environment of a preferred embodiment of the invention.

Referring to the drawings, and particularly to FIG. 1 thereof, the invention is incorporated in a horizontal spindle type machine provided with a longitudinally extending base 25 and a forwardly extending base section 26. A vertically upstanding column 28 is slidably carried by the base 25 by means of cooperating ways [not shown] for selective longitudinal movement in either direction, along the X axis. The vertically upstanding column 28 is provided with lower and upper lateral extensions 29 and 30 that are respectively disposed to support the opposite ends of a rotatably journalled elevating screw 34. The column 28 is provided with vertically extending guideways 35 and 36, respectively disposed to slidably engage cooperating guideways [not shown] presented by the inner side face of a vertically movable spindle head 37. The usual elevating screw nut [not shown] is secured within the spindle head 37 in a manner to operatively engage the vertically journalled elevating screw 34. The spindle head together with a forwardly extending extension 39 secured thereto is disposed to rotatably support a tool spindle 40 extending rearwardly therethrough in a manner to be selectively driven by a transmission contained within the spindle head 37. As represented in FIG. 1, a milling cutter 43 is secured within the forward tool receiving end of the spindle 40. On the embodiment of this invention the spindle will receive a tapping tool.

The forwardly extending base extension 26 is provided with horizontally disposed, spaced apart way surfaces 45. The spaced apart way surfaces 45 in turn are disposed to slidably support a saddle 48 for selective transverse movement relative to the frame 25, and the tool spindle 40.

It will be apparent that the tool spindle 40 is supported for vertical movement along a Y axis, and longitudinal movement along the X axis relative to the saddle 48 which is transversely movable along Z axis. On its upper surface, the saddle 48 is disposed to rotatably support an index table 49, that in turn has releasably secured to its upper surface a work supporting pallet 50. The pallet 50 is releasably clamped to space apart ways [not shown] presented by the rotary table 49, and which are movable into alignment with longitudinally extending ways 52 presented by a right pallet support 53, and longitudinally extending ways 54 presented by a left pallet support 55. Another work supporting pallet 57 slidably carried upon the ways 54 is positioned in a loading station in preparation for subsequent movement along the ways into operative position upon the rotary table, as the pallet 50 is moved therefrom into an unloading station upon the ways 52. Inasmuch as the transfer mechanism for effecting selective movement of the pallet 50 into an unloading station is not a part of this invention, the operative structure and control arrangement is not disclosed herein. This mechanism is fully disclosed in U.S. Patent No. 3,099,873, entitled "Shuttle Operated Tape Controlled Machine Tool."

During a machining operation, a pallet, such as the work supporting pallet 50, is fixedly clamped to the upper surface of the rotary table 49 for indexable movement therewith, and for selective transverse movement with the saddle 48 along the Z axis. The arrangement is such that, during a tapping operation for example a metal cutting tap [not shown] secured within the tool spindle 40 is moved to a selected position along the X and Y axes, and the work saddle 48 is moved inwardly along the Z axis the required distance to perform the tapping operation, and then moved outwardly to permit repositioning of the tool spindle. Likewise, it will be apparent that other machining operations can be performed by effecting movement along any one axis.

One of the principal advantages of this invention is the fact that the rate of rotation of the tap is set with relation to the rate of feed of the tap into the workpiece by the workpiece slide 48, and that these rates are modulated in varying amounts whenever they are disproportionate to pitch feed of the tap into the work.

As hereinbefore explained, all machine movements and functions, including the tool change function, are controlled by an electronic control system 41 responsive to a tape reader contained within the cabinet 42.

Figures 2, 2A, 3:
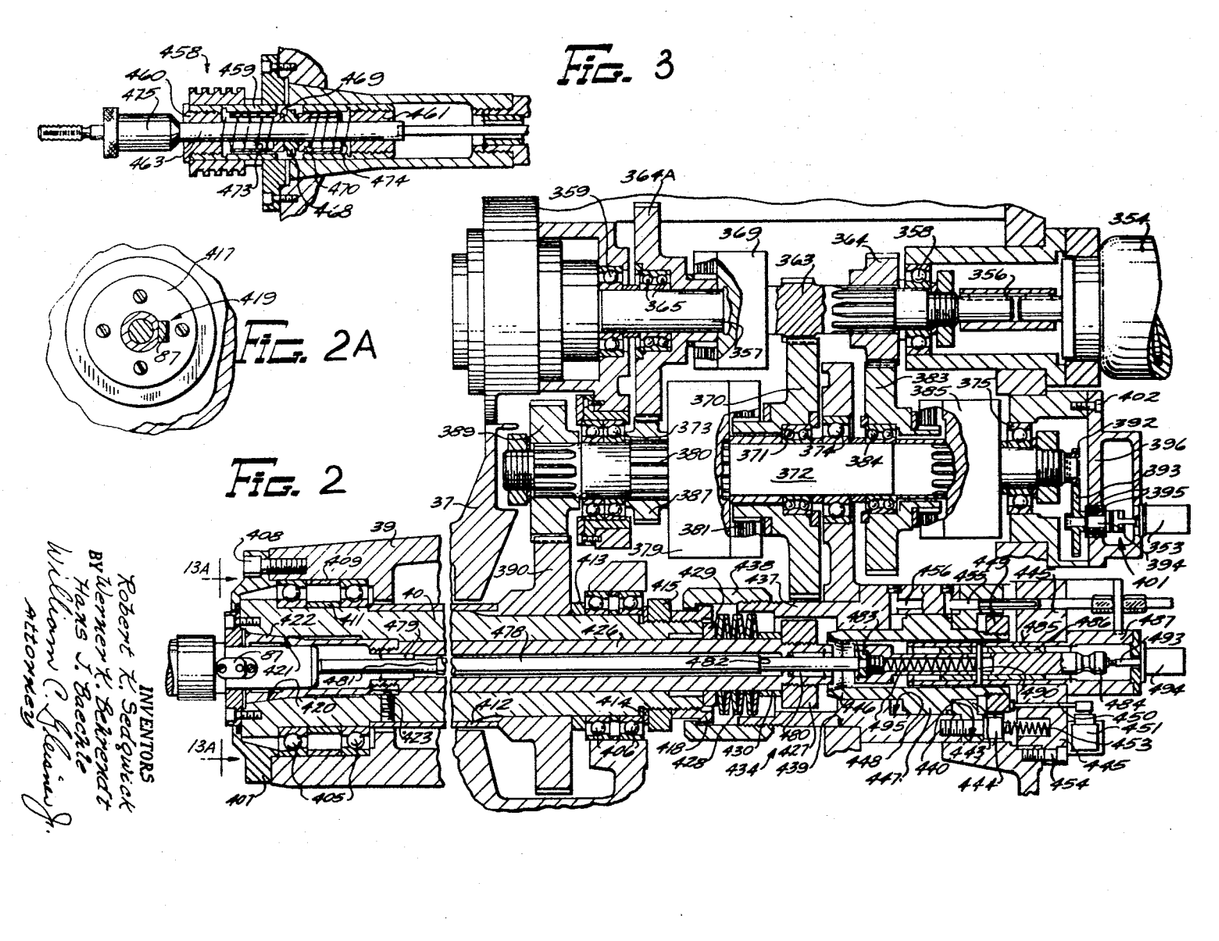
FIG. 2 is a view in transverse vertical section through the spindle and showing the transmission and collet release mechanism.
FIG. 2A is an enlarged fragmentary view in front elevation of the tool spindle.
FIG. 3 is an enlarged fragmentary view in vertical section through the front end of a spindle in combination with a tap holder.
Figure 5:
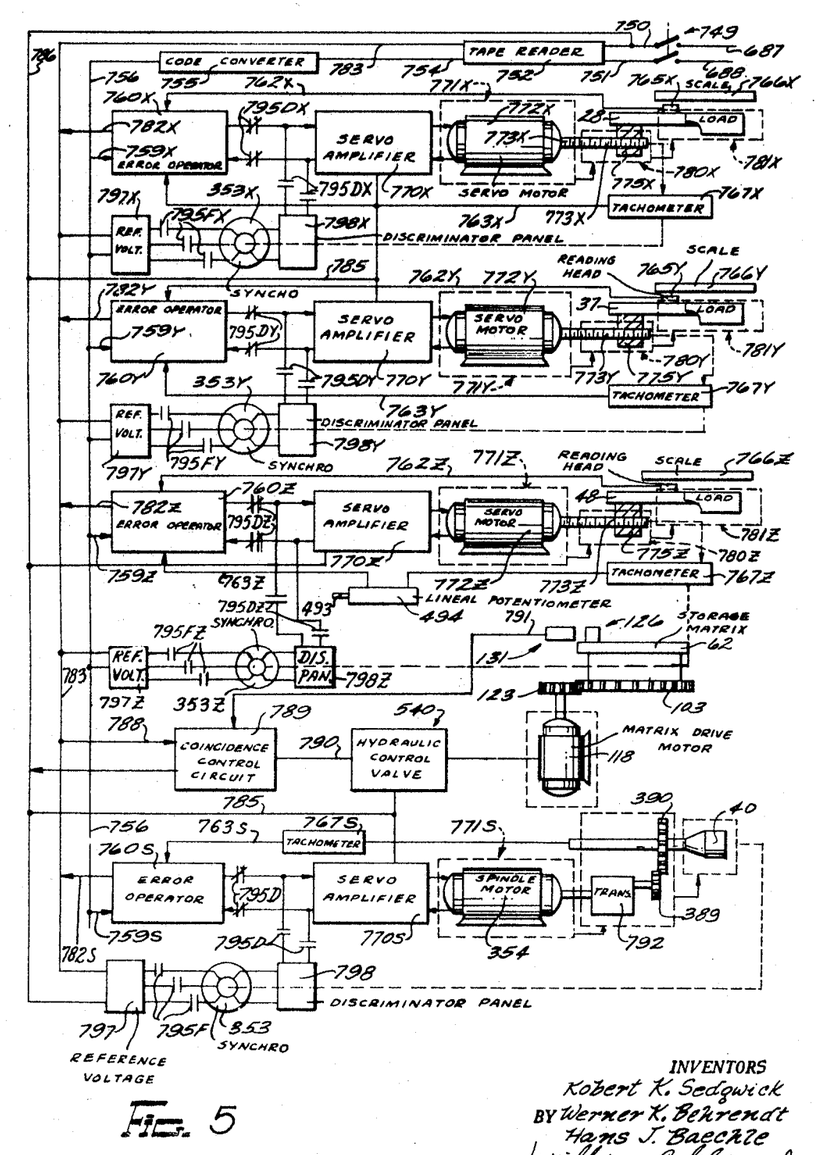
FIG. 5 is a schematic, block diagram illustrating the power control circuit for effecting selective movement of the various machine tool slides in response to the tape input.

As a prerequisite to effecting a tool changing operation as disclosed in the aforementioned co-pending applications, it is necessary to bodily move the entire tool spindle 40 along the X and Y axes to the proper, required position in operative proximity to the tool change mechanism 60, as shown in FIG. 1. During this interval of moving the tool spindle bodily into the required position for a tool change, it is likewise necessary to rotate the tool spindle to a predetermined angular position in which the keyway presented thereby is in a corresponding position to the keyway in the tool storage socket. The positioning control for effecting the equiangular position of the tool spindle is a synchro 353, as shown in FIGS. 2 and 5, having a rotor connected to be driven whenever the tool spindle is rotated under power for effecting a machining operation. The power drive for rotating the tool spindle 40 is utilized both to drive the spindle for a machining operation as well as effect the desired positioning control of the spindle to a predetermined angular position in response to operation of the synchro 353. This is accomplished electrically, as will hereinafter be more fully explained, with the synchro 353 providing an error signal to effect angular positioning movement of the tool spindle 40.

As shown in FIG. 2, a variable speed hydraulic motor 354 is connected to supply the input power for rotating the tool spindle 40. Power is transmitted from the output shaft of the motor 354 to a variable speed transmission, generally identified by the reference numeral 792, via a coupling 356 connected to drive a shaft 357 journalled in bearings 358 and 359, the outer races of which are supported in suitable bored openings formed within the spindle head 37. The shaft 357 is provided with gear teeth 363 integrally formed therewith, an intermediate speed output gear 364 splined to the shaft, and a high speed output gear 364A rotatably journalled upon the shaft 357 by means of a bearings 365. An electromagnetic clutch 369 is selectively operative in a well-known manner to transmit power from the shaft 357 to drive the high speed output gear 364A.

The low speed driving gear 363 is connected to meshingly engage a gear 370 rotatably supported by a bearing 371 upon the central portion of a shaft 372 journalled within the spindle head 37 by spaced apart bearings 373, 374 and 375. Whenever it is desired to drive the shaft 372 at the lowest driving ratio, an associated electromagnetic clutch 379 is selectively operative in a well-known manner to transmit driving power from the input gear 370 to rotate the shaft 372. The clutch 379 is provided with a driven portion fixedly secured to the splined portion 380 of the shaft 372, and is operative to effect engagement of drive plates 381, several of the plates being splined to the hub of the gear 370, and several other of the plates being keyed to the driven portion of the clutch 379.

The gear 364, splined to the shaft 357, is disposed to engage the gear 383 rotatably supported upon the shaft 372 by a bearing 384 and being selectively connected in well-known manner to drive the shaft 372 by operation of an associated electromagnetic clutch 385. The high speed driving gear 364A journalled to rotate about shaft 357 engages an input gear 387 provided with a hub having internal splines disposed to operatively engage the peripheral splines 380 presented by the shaft 372. Inasmuch as the gear 387 is splined directly to the shaft 372, the high speed driving ration is effected by selectively activating the electromagnetic clutch 369. It will be apparent that only one of the electromagnetic clutches including 369, 379 and 385 is energized to effect the appropriate desired driving ratio of shaft 372. For example, with clutch 369 energized to drive shaft 372 at the high speed ratio, clutches 379 and 385 are deenergized. In a similar manner to drive the shaft 372 at the lowest speed ratio, clutches 369 and 385 are deenergized while clutch 379 is energized to effect the low speed connection. Actually, the clutches 369, 379 and 385 are respectively adapted to provide three separate range changes, with appropriate speed changes in each range being effected by selective operation of the input motor 354.

For driving the tool spindle 40 at a selected speed in the desired range, an output gear 389 splined to the leftward end of shaft 372 engages a gear 390 that in turn is splined directly to the central portion of the tool spindle 40.

For maintaining the proper angular relationship between the rotor of the synchro 353 and the tool spindle 40, the synchro 353 is disposed to be rotatably driven by a direct gear connection irrespective of the selected rate of tool spindle movement. To accomplish this, an output gear 392 is fixedly secured to the rearward end of the spindle drive shaft 372. The gear 392, in turn, engages a cooperatng gear 393 fixedly pinned to the inner end of a stub shaft 394, the latter being rotatably supported by bearings 395 having their outer races constrained within a suitably bored opening in a cover plate 396 secured to the spindle head 37. The stub shaft 394 is connected via a flexible coupling 401 to drive the rotor shaft of the synchro 353, the stator of which is secured directly to a supporting web integrally formed with, and spaced rearwardly from the cover plate 396. It will be apparent, therefore, that the rotor of the synchro 353 is continuously driven via flexible coupling 401, stub shaft 394, gears 393 and 392 by the shaft 372; the latter being directly connected via splined output gear 389 to the gear 390 which in turn is splined directly to the tool spindle 40. By means of this arrangement, the rotor of the synchro 353 is continuously maintained in the proper angular relationship to the tool spindle 40. Likewise, by means of this arrangement, the entire timing control arrangement including the synchro 353 can be directly removed from the machine by withdrawing cap screws 402 to remove the rear cover plate 396, the latter constituting a support for the interconnected parts of the timing control device.

The tool spindle 40 is journalled to rotate within the spindle head in a pair of front spindle bearings 405, and a pair of rearwardly spaced spindle bearings 406.

The outer races of the front spindle bearings 405 are seated within a circular flanged opening formed in the spindle extension 39, and are secured therein by means of a bearing retainer 407 fixed to the front end of the spindle extension 39 by means of peripherally spaced cap screws 408. The outer races of the spindle bearings 405 are maintained in proper axially spaced relationship by means of a tubular spacing collar 409. In a similar manner, a flanged shoulder toward the front end of the spindle 40 is adapted to receive the inner races of bearings 405, separated by a tubular spacer 411. Clamping pressure for retaining the spindle 40 in engagement with the bearings 405 is exerted by a rearward tubular spacer 412, the hub of gear 390, a spacing washer 413, the inner races of bearings 406, and a spacer 414 seated against a clamp nut 415 threaded directly on the rearward end of the spindle 40. A flanged collar 418 is threaded on the spindle rearwardly of the adjustable clamp nut 415. Thus, the entire spindle assembly including the flanged collar 418 as well as the parts spaced forwardly therefrom are rotatable as a single unitary structure upon rotation of the spindle drive gear 390.

As shown in FIGS. 2 and 2A, a circular plate 417 is fixedly secured to the front end of the tool spindle 40. The plate 417 is provided with a circular opening adapted to receive the shank of a toolholder and a keyway 419 adapted to be releasably engaged by a toolholder key 87 in a manner that interengaging abutment faces are provided for establishing a positive driving connection between the tool and the tool receiving spindle. For releasably retaining a tool in operative engagement with the tool spindle 40 a power actuated tool retaining means is provided which in this particular instance is a power operated expansible split collet 422. The forward end of the tool spindle is provided rearwardly of the plate 417 with a bored tapered opening 420 adapted to receive the complementary tapered periphery 421 of an axially movable split collet 422. To permit a slight forward axial movement of the collet 422 into released position, the front end thereof is spaced a slight distance rearwardly from the inner face of the spindle plate 417. Normally, as will hereinafter be explained, the collet 422 is resiliently biased toward an inner clamped position, as shown in FIG. 2. Toward its rearward end, the collet 422 is provided with a keyway disposed to be slidably engaged by the inner end of a set screw 423 threadedly engaged in a radially tapped opening in a peripheral wall of the tool spindle 40. In axially forward released position, as well as during axial movement in either direction, the collet 442 is retained in fixed angular relationship to the spindle 40 by means of a set screw 423. In its axially rearward clamped position, as shown in FIG. 2, the collet is retained in fixed angular position both by the set screw 423 and the clamped engagement between the complementary tapers respectively presented by the collet 422 and the tool spindle 40. To effect clamping movement, the collet is provided with a plurality of peripherally spaced, longitudinally extending slots [not shown] in well-known manner. To provide a positive driving connection between a tool and the spindle 40 during rotational movement thereof, the key 87 secured to the toolholder is adapted to be retained in engagement with the complementary keyway 419 presented by the spindle plate 417 by clamping engagement of the collet with the shank of the toolholder. Thus, with a milling tool fixedly clamped to the tool spindle 40 by means of the collet 422, as shown in FIG. 2, the spindle 40 operates to positively drive the milling cutter during a machining operation. This arrangement provides both a coaction between the tapered, mating surfaces presented by the collet and tool spindle to concentrically align a cutter with the axis of spindle rotation; and a clamped engagement with the tool to maintain a positive drive by means of the interengaged key and keyway. In other words, this particular arrangement provides the advantages of both a keyed positive drive together with the quick release permitted by the axially movable split collet 422.

For releasing a tool prior to a tool change, the collet 422 is urged axially forward permitting the resiliently biased split collet to expand slightly in a manner that a tool can be axially retracted from the tool spindle 40. After a tool interchange has been completed, and the interchanged tool inserted into the collet, the collet 422 is urged axially in a rearward direction in a manner to positively clamp the selected tool in driving engagement with the tool spindle 40. Immediately prior to rearward axial movement of the collet 422 taking place, the tool is being inserted into the disengaged collet 422. As this occurs, the beveled inner end of the key 87 engages the keyway 419 to effect a slight necessary angular alignment of the tool within one or another of the tool changing grips, thus permitting the key to move into exact registration with the cooperating keyway. As this occurs, as will hereinafter be more fully explained, inserting movemen of the tool is likewise connected to disengage the dynamic angular positioning effect of the spindle positioning synchro 353. After this, with proper alignment existing between the tool and the spindle, and with the toolholder fully inserted into the unclamped collet, the collet is urged rearwardly to effect the necessary clamping engagement.

For effecting selective axial movement in either direction, the inner, rearward end of the collet 422 is threadedly engaged with the forward end of a rearwardly extending tubular draw-in-rod 426. The tubular rod 426 extends through an axially extending bored opening in the spindle 40, and has secured to its rearward end a threaded abutment collar 427. A resiliently expansible stack of disk springs 428 is seated between thrust collars 429 and 430 the opposite ends of which respectively abut the end of the tool spindle 40 and the inner face of the abutment collar 427. Thus, the springs 428 are normally operative to urge the collar 430 and abutment collar 427 rearwardly relative to the spindle 40 to effect corresponding inward movement of the tubular draw-in-rod 426, thus maintaining the collet in clamped engagement with the toolholder. To release the collet, prior to effecting a tool changing operation, it is necessary to urge the abutment collar 427 axially forward, compressing the disk springs 428, and effecting forward movement of the tubular rod 426 and collet 422 to released position. In order to prevent damaging the spindle bearings during an automatic tool release, there is provided an axially floating release mechanism 434 operative to simultaneously urge the flanged collar 418 and collar 427 in directions to compress the disk springs 428 therebetween. To accomplish this, the release mechanism comprises a cylinder 437 carried for axial movement within spaced apart bored openings 439 and 440 formed in transverse webs within the spindle head 37. The cylinder 437 is adapted to carry a tubular extension 438 provided with an inwardly extending flanged end disposed to overlie the flange presented by the collar 418. At its rightward end, the cylinder 437 is provided with a flanged cover 443 secured thereto by means of cap screws 444. The cylinder cover 443 is resiliently urged inwardly relative to an end cover 445 secured to the spindle head 37 by cap screws 454. To this end, each of the peripherally spaced cap screws having pilot extensions engaging one end of peripherally spaced springs 453 seated at their opposite ends in circular recesses formed in the end plate 445. The springs normally urge the cylinder 437 to move leftwardly in a manner that the flange of extension 438 is not engaging the flanged collar 418. As hereinbefore explained, the flanged collar 418 is threadedly secured to the rearward end of the tool spindle 40 and is disposed to rotate therewith during a machining operation. Normally, therefore, the flanges respectively presented by the spindle collar 418 and the cylinder extension 438 are not in direct abutting engagement.

Spaced in rightward concentric relationship to the thrust collar 427 is the leftward end 446 of a piston 447 slidably carried for axial movement within a cylindrical opening 448 formed in the cylinder 437. A collar 449 secured to the rightward end of the stepped diameter piston 447 is provided with an actuating rod 450 extending outwardly through a bored opening in the end plate 445 to actuate a switch 451. For releasing the collet 422, hydraulic fluid under pressure is admitted via a supply line 455 to effect leftward movement of the piston 447 and corresponding leftward movement of the leftward end 446 thereof into engagement with the thrust collar 427. As this occurs, continued pressure through supply line 455 effects movement of the piston end 446 and cylinder extension 438 in opposite directions to compress the stack of disk springs 428 and urge the collet 422 axially outward to disengaged position. Thus, during disengagement of the collet 422, pressure fluid through line 455 effects rightward movement of the cylinder 437 to urge the flanged end of extension into abutting engagement with the flanged collar 418 in opposition to leftward movement of the left end of the piston 447 against the thrust collar 427 to compress the springs. During disengagement of the collet 422, therefore, neither the piston 447 nor the cylinder 437 exert any end thrust on the spindle bearings.

At the completion of a tool change cycle, with the interchanged tool inserted within the collet clamp 422, the pressure fluid is disconnected from inlet line 455, with fluid now being admitted via a line 456 to effect rightward retracting movement of the tubular piston 447, with the disk springs 428 now functioning to urge the tubular draw-in-rod 426 rightwardly for reclamping the collet 422. As this occurs, springs 453 urge the cooperating cylinder 437 bodily in a leftward direction as limited by a shoulder adjacent bored openings 439.

The tool spindle 40 is adapted to receive a toolholder carrying a milling cutter or drill and also is adapted to receive a tap, as shown in fragmentary form in FIG. 3. In either case, the tubular draw-in-rod 426 is resiliently biased into clamping engagement with a tool-holder by operation of the disk springs 428, FIG. 2. Likewise, to release the collet clamp 442 prior to effecting a tool change, the piston 447 is movable in a leftward direction to effect axial movement of the tubular draw-in-rod 426 in the leftward direction.

As represented in FIG. 3, a toolholder adapted to support a tap comprises essentially a tubular body portion 459 threaded at its opposite ends to receive supporting plugs 460 and 461, each being provided with a concentrically aligned bored opening adapted to slidably support a tool carrying shaft 463. A collar 468 pinned to the central portion of the shaft 463 is normally retained in abutting engagement between the inner faces of resiliently biased cup faced thrust washers 469 and 470. The collar 468 is provided with radial arms engaging longitudinal slots to effect a positive drive to shaft 463. Springs 473 and 474 seated at their outward ends against the plugs 460 and 461 are seated at their inner ends within tubular recesses formed within the cup shaped washers 469 and 470 in a manner to normally urge the collar 468 and the tool supporting shaft 463 to a central intermediate position. At its forward end, the shaft 463 is provided with a releasable toolholder 475 for securing a tap to the shaft for corresponding axial movement therewith.

Whenever a tap holder, such as the holder 458 in FIG. 2 is secured within the collet 422 provided in the spindle 40, the rearward end of the axially movable shaft 463 is moved into abutting engagement with the end of an axially movable tap control rod 478 extending longitudinally through a bored opening formed in the tubular draw-in-rod 426. The control rod 478 is slidably supported for axial movement within a pair of spaced apart tubular bushings 479 and 480, FIG. 2 secured within the opposite ends of the tubular draw-in-rod 426. To limit axial movement of the control rod 478, the central portion thereof is enlarged slightly to provide shoulders 481 and 482 respectively coacting with adjacent abutments to limit the extent of movement in either direction. The extreme rightward end of the rod 478 extends within a pilot bearing 483 carried within a circular bored opening formed in the enlarged end of an axially movable pilot rod 484, FIG. 2. The pilot rod 484 is guided for axial movement by a tubular sleeve bearing 486 secured within the inwardly extending portion 485 of a tubular support housing 487. The transverse end plate 445 secured to the rearward portion of the spindle head 37 by cap screws 454 is provided with a bored opening adapted to support the tubular housing within an axial bored opening extending through the tubular control piston 447. Thus, the pilot rod 484 is maintained in concentric operative relationship to the end of the axially movable control rod 478. A pin 490 fixed at its opposite ends in the wall of the tubular housing 485 is disposed to engage slotted openings in the pilot rod 484 to restrain the rod against rotational movement. The outer end of the control pilot rod 484 is threadedly engaged with the inner end of an actuating plunger 493 carried for axial movement by a lineal potentiometer 494, the latter being fixed to a cover secured to the outer end of the tubular housing 487. A spring 495 is seated within a bored opening extending partially through the pilot rod 484, and is seated at its rightward end against the pin 490. At its opposite end, the spring 495 is seated against a plug threaded in the leftward end of the bored opening formed in the pilot rod 484. Thus, the rod 484 is urged leftwardly by spring 495. The arrangement is such that the force exerted by spring 495 plus spring 474 is substantially equal to the opposing force exerted by the spring 473 in the tap holder 458, as shown in FIGS. 2 and 3.

Whenever a tapping toolholder 458 is operatively secured within the tool spindle 40, FIGS. 2 and 3, the rightward end of an axially floating shaft 463 is brought into abutting engagement with the leftward end of the tapping control rod 478 with sufficient force to compress the spring 495 contained within the pilot rod 484. Thus at the start of the tapping operation, the collar 468 secured to the tapping support shaft 463 is normally biased into its central neutral position with respect to the toolholder 458, the spring 473 exerting sufficient pressure to compress the spring 495 in the pilot rod 484. Any further movement of the shaft 463 in either direction from its normal floating central position effects a corresponding axial movement of the control rod 478 and pilot rod 484 with a consequent actuation of the lineal potentiometer 494. As will hereinafter be more fully explained, the lineal potentiometer 494 is operatively connected to effect a continuous modulating type control of the axial feeding rate of the tool spindle 40 during a tapping operation. Thus, the proper relationship is always maintained between rotational speed of the spindle for effecting a tapping operation and the axially outward feeding movement thereof.

Figure 4:
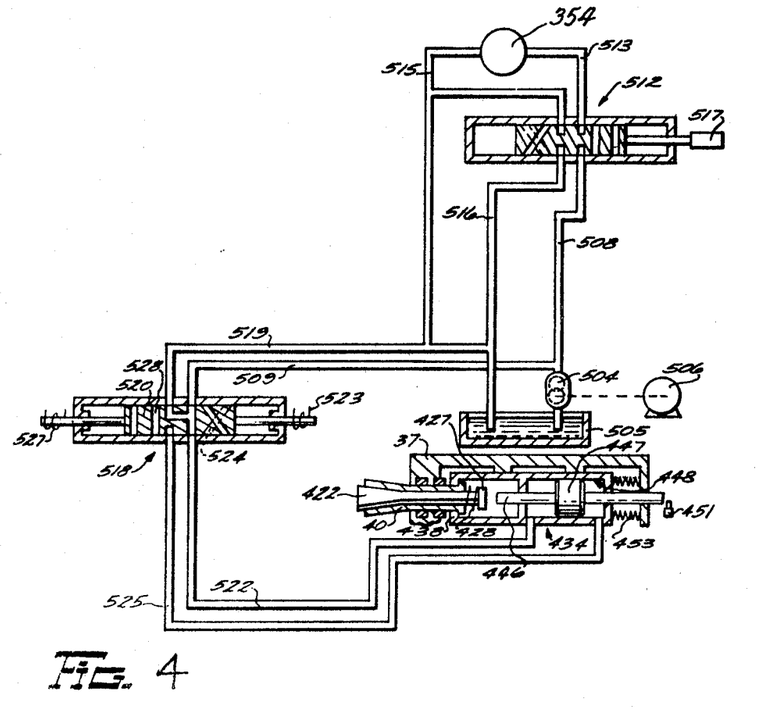
FIG. 4 is a schematic hydraulic circuit circuit diagram illustrating the control for the tool spindle motor and the collect release mechanism.

As shown in FIG. 4, there is provided a hydraulic circuit for operating the tool spindle motor and the collet release mechanism. Hydraulic fluid under pressure is withdrawn by a pump 504 driven by a motor 506 from a sump 505 to supply fluid under pressure to lines 508 and 509. A servo control valve 512 is schematically represented as interconnected between the pressure supply line 508 and a suply line 513 connected to a hydraulic motor 354. Another hydraulic conduit 515 is connected between the motor 354 via the servo control valve 512 to a return line 516. The servo control valve 512 is operative in well-known manner under the control of a motor 517 to selectively vary the rate of rotation of the spindle motor 354. The motor 517 is likewise connected, as will hereinafter be more fully explained, to operate the motor 354 at a preselected speed, with an error signal being connected to maintain substantially constant speed. From the pump 504, the conduit 509 is connected to supply fluid under pressure to the inlet port associated with a control valve 518 for the collet clamp release mechanism. Another port of the control valve 518 is connected via hydraulic line 519 to the exhaust line 516. With a valve spool 520 of the control valve 518 in a central neutral position as shown in FIG. 4, the inlet pressure line 509 is connected via a port in the valve spool to an outlet line 522, as well as the exhaust line 519. Thus, fluid under reduced pressure from line 522 flows into the cylinder 448 to retain the piston 447 in a rightward position relative to its cooperating cylinder 448, permitting the springs 453 to urge the piston 447 leftwardly. Energization of a solenoid 523 effects leftward movement of the valve spool 520 thereby connecting the pressure supply conduit 509 via a valve cannelure 524 to a hydraulic line 525. At the same time, with the valve spool 520 in leftward position, the hydraulic line 522 is connected via another cannelure in the valve spool to the exhaust line 519. With this condition existing, the admission of pressure fluid from line 525 into cylinder 448 effects leftward movement of the piston 447 until the extreme leftward end thereof is moved into abutting engagement with thrust collar 427. Thereafter, continued pressure effects movement of the piston 447 and cylinder 448 in opposite directions in a manner that the flange 438 abuts the flange secured to the rearward portion of the tool spindle 40. Consequently, spring 428 is compressed and a spring collet 422 is urged leftwardly a slight distance relative to the tool spindle 40 to release a tool secured therein. Whenever the spring collet is to be reclamped for securing a tool in operative engagement with the tool spindle 40, the solenoid 523 is deenergized and a solenoid 527 energized to effect movement of the valve spool 520 to its extreme rightward position. With the valve spool 520 in rightward position, fluid from the rightward end of the cylinder 448 is exhausted via line 525, a cannelure in the rightwardly moved valve spool 520 to the main exhaust line 519. At the same time, pressure fluid from supply line 509 flows through a cannelure 528 in the valve spool to the line 522, the pressure fluid through hydraulic line 522 effects rightward movement of the piston 447 relative to the cylinder 448 to disengage the leftward end 446 thereof from abutting engagement with the thrust collar 427. With this condition existing, the springs 453 operate to effect a slight leftward movement of the cylinder 448 relative to the supporting spindle head 37 in a manner to move the flanged extension 438 out of engagement with the flange secured to the spindle 40. The flange 438 is normally moved leftwardly a sufficient distanct to permit rotational movement of the spindle 40 and the flange secured thereto.

To effect bodily movement of the major movable members along the X, Y and Z axes, there is provided a tape control system schematically shown in FIG. 5. As there shown, closure of a switch 749 connects energized conductors 687 and 688 to energize conductors 750 and 751 respectively. Energized conductors 750 and 751 are directly connected to energize a tape reader 752, which is operative in well-known manner to transmit output signals from a coded punched tape [not shown] to an output conductor 754. The tape reader 752 is adapted to transmit digital information from moving tape [not shown] of the well-known punched tape to effect movement of the major movable members, as well as supplying, where required, the signals for effecting indexable movement of the tool storage magazine to preselect the next tool, and provide a signal for initiating a tool change cycle. As well known in the art, the tape reader is provided with a plurality of switches operative in binary code form by means of switch plungers engaging appropriately spaced holes in the punched tape, as the tape is mechanically advanced relative to the reader. From the tape reader 752, the conductor 754 is operable to activate a code converter 755 disposed, in turn, to convert information from the tape code to decimal code; store this information in registers in the form of sine-cosine voltage ratios for predetermined selected point to point positioning; and linear voltage ratios for velocity control. In addition to converting and storing information for the X, Y and Z axes, the code converter 755 is also operative to store information in binary code form relative to the required speed of the tool spindle; the selected indexed position of the rotatable tool storage magazine for preselecting a tool; and, for initiating a tool change cycle.

From the code converter 755, machine operating input signals are transmitted to a common trunk line 756 containing a plurality of branch conductors connected to different error operators.

To simplify the description, the four branch conductors and their error operators have been respectively designated by common numerals 759 and 760, each being followed by an appropriate letter suffix to indicate the particular movement being controlled. Conductor 759X, for example, transmits information from the trunk line 756 to activate the error operator 760X for supplying both positional and velocity control information for moving the column 28 along the X axis. The error operator 760X is operative to receive feed back information via lines 762X and 763X, the latter being respectively connected to supply feed back information as to the position of the column 28 along the X axis and information as to the velocity of the column 28 as it is being moved along the X axis. To provide accurate position feed back information, the line 762X is connected to a position indicator or reading head 765X which is secured directly to the column 28. The reading head 765X is carried for movement relative to a cooperating scale 766X which is secured directly to the supporting frame and connected to be energized by means of supply conductors [not shown]. The cooperative co-action between the reading head 765X and the scale 766X provides an accurate feedback signal to indicate the position of the column along the frame as it is moved to a selected position along the X-axis. The cooperating reading head 765X and energizeable scale 766X are schematically representative of well-known, commercially available units that are operative in the manner described to supply position feedback information.

In a similar manner, to provide feedback information as to the velocity of the column 28 as it is moved along the frame, the line 763X is connected to receive information from the tachometer 767X which is mechanically connected to be driven by movement of the column 28. The error operator 760X operates to produce voltage proportional to the magnitude of the error, as well as indicating the direction of position error. The voltage ratios and binary members stored in the code converter 755, irrespective of whether they are operative to obtain positional or velocity input signals, are compared to the corresponding voltage ratios and binary numbers from the feedback conductors connected to the error operator 760X, with motion being stopped upon the occurrence of coincidence between the feedback supply and the code converter information.

From the error operator 760X, command control information is transmitted to actuate a servo amplifier 770X which is directly connected to accurately control the velocity and extent of movement of a reversible power actuator 771X. The power actuator 771X may comprise an electric motor, or a valve controlled hydraulically actuated servo-motor 772X which is directly connected to drive the column moving translating screw 773X. The translating screw 773X in turn is connected to be engaged by a nut 775X directly secured to the movable column member 28. The general arrangement for effecting movement of the column 28 along the X axis is similar to that utilized for effecting the required movement of the work supporting saddle 48 along the Z axis, spindle head 37 along the Y axis, as well as rotational speed of the tool spindle 40.

As schematically represented in block diagram form, FIG. 5, the power actuator 771X is connected to drive a translating mechanism 780X which, in turn, is directly connected to a load 781X, in this case represented by the column 28. Actually, the translating mechanism 780X is represented as comprising a cooperating screw 773X and nut 775X, although any suitable equivalents may be utilized for these particular elements.

Each of the error operators designated by the common number 760, is connected to a branch conductor 782, the branch conductors designated by the common numeral 782 being in turn connected to a trunk line 783 respectively connected to the tape reader 752. Thus, whenever a particular series of programmed movements of the major members is completed, the error operators 760 are connected via the trunk line 783 to provide a signal to the tape reader 752 which is then operative to supply the subsequently utilizable control information. The signal from the trunk line 783 provides a signal to the tape reader for proceeding with the next block of information on a tape connected to effect machine movements. In a similar manner, the servo amplifiers designated by the common numeral 770 are connected via branch conductors 785 to a common energized line 786.

As hereinbefore explained, the various elements designated by common numerals in the block diagram, FIG. 5, are operative in similar manner to perform identical functions, although the placement of various of these elements is completely different in the associated machine structure, depending upon the particular structural component it is associated with. Although not shown in FIG. 5, a similar power drive responsive to tape reader 752 is connected to effect selective indexable movement of the work supporting table 49. It is to be noted that the tape input from the tape reader 752 is operative to effect both velocity and point to point positioning control of the major members, including the column 28, spindle head 37, and work supporting saddle 48 along the X, Y and Z axes.

In addition to the command information available to these major movable members, separate fixed reference signals are available to effect the required movement of the column 28 and spindle head 37 for positioning the tool spindle 40 in the tool change station. Normally, the tool spindle 40 is provided only with a velocity control as indicated in FIG. 5, inasmuch as the tool spindle 40 is rotated at a selected rate for performing a machining operation. In addition to the velocity control, the tool spindle 40, in this case, is likewise provided with a fixed supply of reference command voltage for moving the tool spindle 40 into the required angular position as a prerequisite to initiating a tool changing cycle.

Bodily positioning movement of the tool spindle 40, as well as angular positioning thereof, is effected in response to an appropriate signal from the tape reader 752, this signal being appropriately spaced upon the punched control tape in relation to the other command information for initiating the various other machine movements or functions.

The positioning of the tool storage magazine 62 is shown in FIG. 5 but this mechanism is not significant to the instant invention and will not be described.

Normally, the rate of the rotation of the tool spindle 40 is under control of the tape reader, via the error operator 760S and servo amplifier 770S, the latter being operative to drive the transmission 792 connected via gears 389 and 390 to rotate tool spindle 40. As hereinbefore explained, the variable speed transmission 792 is selectively operative to provide different ranges of spindle rotation by selective energization of one or another of magnetic clutches 369, 379, or 385 shown in FIG. 2. For a regulating spindle speed, the spindle 40 is directly connected to drive a tachometer 767S which, in turn, is connected to the error operator 760S.

Whenever the tape reader 752 calls for a tool change, it is necessary as a prerequisite thereto to effect the required bodily and angular positioning of the tool spindle 40 as hereinbefore explained. To this end, an alternative positioning control is operative to effect rotation of the tool spindle 40 to the required angular position. The drive for effecting the required positioning movement of the tool spindle prior to initiating a tool change cycle is effected by suitable controls in response to an appropriate signal from the tape reader, FIG. 5, to operate the slow speed spindle clutch to drive the spindle at slow speed. These controls, while found in the copending application, are not significant to this invention.

Energization of the relay coil 795 effects actuation of the associated normally closed and normally open contacts represented in FIG. 5. As there indicated, normally closed contacts 795D are moved to open position to interrupt the control from the error operator 760S. At the same time, normally open contacts 795F are moved to closed position to interconnect conductors from a fixed command reference voltage 797 to the positioning synchro 353. The synchro 353 is operatively connected to a disciminator panel 798 which is now connected via the normally open now closed contacts 795D of the associated energized relay to control the operation of servo amplifier 770S. With this condition existing, the spindle drive motor 354 continues to rotate the tool spindle 40 at a slow speed until it arrives at the appropriate angular position required by the fixed command reference voltage 797. At that moment, the keyway presented by the tool spindle is properly aligned with the corresponding keyway in the tool storage magazine.

In a similar manner, the tool spindle 40 is bodily positioned along the X and Y axes by the appropriate required operation of motor 772X and 772Y. As represented in FIG. 5, fixed reference command voltages are connected to effect the required positioning movement of the column 28 and the spindle head 37 for moving the tool spindle 40 bodily to the required tool change ready station. To simplify the description, reference numerals corresponding to these used for effecting angular positioning movement of the tool spindle 40 are represented with the appropriate letter suffixes as effecting the required bodily positioning movement of the upright column 28 and spindle head 37. After these movements have been completed, as hereinbefore explained, the tool change cycle may be initiated in response to a tape command signal.

As schematically represented in FIG. 5, the lineal potentiometer 494 is operatively interconnected in the feedback conductor 763Z. Thus, during a tapping operation, the control rod 493 for the potentiometer is axially movable to effect a continuous modulating effect on the rate of Z axis movement.

From the foregoing detailed explanation of the operation of the machine tool herein set forth as a practical embodiment of the present invention, it will appear that there has been provided a greatly improved automatic control of a tapping operation.

Although the illustrative embodiments of the invention have been described in considerable detail for the purpose of fully disclosing a practical operative structure by means of which the invention may be practiced, it is to be understood that the particular apparatus and control system herein described are intended to be illustrative only, and that the various novel characteristics of the invention may be incorporated in other structural forms without departing from the spirit and scope of the invention as defined in the subjoined claims.

The principles of this invention having now been fully explained in connection with the foregoing description, we hereby claim as our invention:

1. In a machine tool for operating on work;
    a rotatable tool spindle;
    variable means to rotate the spindle at selected rates and create selected rates of feeding movement between the spindle and the work, said rates of rotational spindle speed and coordinate relative feed rate being selected for a particular tapping tool having an inherent feed rate into the work;
    a tapping tool carried by said spindle for limited axial movement relative thereto during a tapping operation, said tapping tool having a pitch requiring an inherent feed rate into the work comprising a preselected coordinately preset rotational speed rate together with a cooperating preselected feeding rate between the spindle and the work;
    means for continuously modulating the ratio between said selected rates in varying degrees whenever the selected rates become disproportionate to the inherent feed of the tool into the work; and
    means connected to move said modulating rate control means in response to the axial control movement of said tapping tool relative to said tool spindle.

2. In a machine tool in accordance with claim 1 wherein, said modulating means includes a potentiometer actuated by said relative movement.

3. In a machine tool in accordance with claim 2 wherein,
   a source of signals is provided for automatically controlling the machine tool including the selection of the rates for a particular tapping tool;
   a feed back error signal circuit is provided in accordance with the relative feed movements;
   an error operator is provided coordinating the signal rate commands from said source of signals and the error signal; and
   means connecting said potentiometer in said error signal circuit.

References Cited
UNITED STATES PATENTS

| | | |
|---|---|---|
| 1,905,132 | 4/1933 | Bishop et al. _____ 77—32.7 X |
| 2,601,157 | 6/1952 | Le Lan. |
| 2,916,931 | 12/1959 | Cunningham. |
| 3,052,011 | 9/1962 | Brainard et al. _____ 77—5 X |

ANDREW R. JUHASZ, Primary Examiner

U.S. Cl. X.R.

77—32.7